United States Patent [19]
Langecker

[11] 3,738,788
[45] June 12, 1973

[54] BLOW-MOULDING MACHINES
[76] Inventor: Erhard Langecker, Hohbuschener Weg 5, Meinerzhagen, Germany
[22] Filed: May 24, 1971
[21] Appl. No.: 146,307

[30] Foreign Application Priority Data
May 25, 1970 Germany............ P 20 26 972.1

[52] U.S. Cl..................... 425/326, 425/387, 264/99
[51] Int. Cl................................................ B29d 5/06
[58] Field of Search ................... 425/326 B, 387 B; 264/98, 99

[56] References Cited
UNITED STATES PATENTS
| | | | |
|---|---|---|---|
| 2,858,564 | 11/1958 | Sherman et al. | 425/326 B X |
| R25,290 | 12/1962 | Parfrey | 425/326 B X |
| 3,491,404 | 1/1970 | Mehnert | 425/326 B |
| 3,516,118 | 6/1970 | Gallay | 425/326 B X |
| 3,640,661 | 2/1972 | Gasior et al. | 425/387 B X |

Primary Examiner—R. Spencer Annear
Attorney—Watson, Cole, Grindle & Watson

[57] ABSTRACT

A blow-moulding machine having a pair of stationary moulds and a single vertically and pivotally movable extruder above the moulds for supplying extrudate alternately to the respective moulds, movements of the extruder being controlled by a guide track arrangement and a piston and cylinder assembly, and each mould comprising a moulding cavity and a waste removal and ejecting cavity transfer means being provided for transferring a blown product from the moulding cavity to the waste removal and ejecting cavity.

8 Claims, 2 Drawing Figures

Inventor:
ERHARD LANGECKER
BY
WATSON COLE GRINDLE & WATSON
ATTORNEYS

Inventor:
ERHARD LANGECKER
BY
WATSON COLE GRINDLE & WATSON
ATTORNEYS

BLOW-MOULDING MACHINES

The invention relates to blow-moulding machines for the manufacture of hollow bodies in thermo-plastic material.

In one type of known blow-moulding machine, an extruder and a mould are both in fixed positions. In one design, the mould is directly below the head of the extruder. This means that continuous extrusion of a tube is not possible, as extrusion can only take place when the mould is open. When the mould is closed, the extrusion process must be interrupted. In a further design, the mould is at some distance below the extruder. This system does not allow continuous extrusion. A transfer mechanism must be provided to remove the end of the tube from the extruder head and lower it into the open mould. When the mould is closed, the transfer mechanism moves upwardly and takes from directly below the extruder head a fresh tube end and then lowers this into the mould. In this design the blowing must be carried out from underneath. In a further design, the mould is below and laterally displaced from the extruder. Here, too, a transfer mechansim is necessary, but in this case it must perform with vertical and horizontal movements to take a tube end from the extruder head and transport it to the mould. As a result of this horizontal and then vertical movement to bring the tube into the mould, the additional risk of the tube oscillating occurs. In this case, the blowing process can be carried out from above. Moreover, a mould can be fitted on each side of the extruder, making a much faster extrusion process. In a further design, the extruder is in a fixed position and the mould is movable. Here, a transfer mechanism is not needed as a result of the movable arrangement of the mould. In one design, the mould is located directly beneath the extruder and performs vertical movements in order to take the tube from its upper position at the extruder head and to remove the finished hollow body at the lower position after the blowing process. In this design, the blowing must be carried out from underneath. In a variation of this design, the mould is displaced sideways in relation to the extruder. It must then perform reciprocatory movements. Blowing from the top is possible in this case, but there is a risk of the tube buckling while the mould is being closed below the nozzle head. Here, the blowing can be carried out from above. Yet another variation is known, in which the mould can be moved either in an upwards or a downwards direction, or obliquely downwards. Here, too, the blowing can be carried out from above; and the risk of buckling of the tube is reduced by means of the vertical or oblique mobility of the mould.

In a further design of machines of this type, the extruder is movable and the mould is fixed. Here, the mould and the extruder lie on the same axis. The extruder must be movable vertically in an upward and downward direction. Blowing is only possible from underneath. Moreover, only one mould can be used.

In yet a further design, both the extruder and the mould are movable. Here, the mould travels in a circuit around a vertical or horizontal axis and the extruder is movable in an upward and downward direction. A transfer mechanism is not necessary, continuous extrusion is possible and a number of moulds can be used by being placed on a table, which is rotatable through a vertical or a horizontal axis.

The known designs described above all have disadvantages if continuous extrusion is to be carried out, such as is desirable in the interests of an economic and satisfactory operating programme. If additional transfer mechanisms are required to transfer the tube from the nozzle of the extruder to the mould, additional constructional expenditure will result. If the mould is mounted in such a manner that it is movable, there must also be a closing device, which must be of a certain weight, thereby entailing additional expenditure for the transfer mechanism. If the extruder is movable and is intended to fill a number of moulds located around it, there is a risk of an oscillation of the tube during transfer from the horizontal to the vertical plane of movement, which also presents a problem.

The present invention provides a blow moulding machine having a movable extruder with an extruder head mounted above a blow mould wherein a guide track is provided for controlling movements of the extruder and extruder head, said guide track having an upper vertically extending section laterally displaced from a vertical axis of the mould, a lower vertically extending section providing a position for the extruder head for delivering extrudate into the mould and an inclined intermediate section connecting the upper and lower sections.

It is an object of the present invention to reduce disadvantages occurring as a result of lateral movement of the mould closing device and to avoid the use of a transfer mechansim, during continuous extrusion, to reduce to a minimum the oscillation of the tube when the extruder is arranged in a movable manner, and further, to ensure, when there are two moulds that the tube is always passed into the mould in the same relative position. This question is important, when, for example, bottles with an irregular cross-section are required, or if a label or stamp is to be applied to the bottle during the blowing process. In this case, a fixed mould is of advantage, as any sudden movements of the mould, can have an adverse effect on the attachment of the label. When a label is applied during the blowing stage, separation of the waste cannot take place in the blow mould itself. For this reason, a machine in accordance with the invention may provide two moulding cavities located side by side in the mould, whereby the blowing process takes place in the cavity nearest to the extruder, while the waste material is separated in the second cavity. For this purpose, a moulding spindle and a separator spindle are provided. The moulding spindle and the separator spindle are independently mounted and are movable in a vertical direction and simultaneously in a horizontal direction. After a hollow body has been blown in the first moulding cavity, the moulding spindle and the separator spindle are displaced horizontally when the mould is opened. When the mould is closed, the moulding spindle and the separator spindle are raised, moved back into their original position and then lowered, so that the moulding spindle enters a new section of tube to be blown in the first moulding cavity while the separator spindle enters the blown bottle that has been taken and blown in the second moulding cavity and in which the separation of the waste material is effected by means of separator pins arranged in an off-set manner to each other in the two halves of the mould. When the mould is opened, the waste material falls out and after a lateral movement the separator spindle is extracted from the finished bottle, so that the finished bottle drops out of the second moulding cavity.

In accordance with the invention, the mould closing mechanism is stationary and the extruder head can move with the extruder upwardly and downwardly and simultanously in a lateral direction in a fixed sinusoidal curve, which has an upper section, which is laterally displaced in relation to the mould and extends vertically, an inclined intermediate section, which leads to the mould and a lower vertically extending section, in which the tube is inserted into the mould.

According to a further feature of the invention the extruder may be mounted on a bracket plate, which is attached at its upper end to a hinge movable in the vertical direction, and a guide roller mounted on the lower part of the bracket plate, engages in the guide track.

A further feature of the invention is that an upper cross-piece is mounted vertically on the machine frame, onto which cross-piece the hinge of the bracket plate is attached, and on which a crank drive, which controls the vertical movements of the bracket plate and the extruder operates.

A further feature is that the upper cross-piece may be connected to a further cross-piece at a lower level, against which a further cross-piece a supporting roller carried by the bracket plate engages.

Further, the machine may have a pair of moulds, the guide track consisting of a single common upper section, and pair of oppositely inclined intermediate sections and a pair of lower sections for the respective moulds. With this arrangement, the upper part of the bracket plate may carry a horizontal arm, between which and the lower cross-piece there is a piston-cylinder arrangement, operable, to guide the extruder so that from the upper section of the guide track it moves alternately into the respective intermediate and lower sections so that extrudate is delivered alternately to the respective moulds.

As a result of the hinged mounting of the extruder, the curve described by its lower end and the crank drive system only low masses have to be overcome with the movements of the extruder and the guide track minimises oscillation of the extruded tube. The arrangement of moulds on both sides of the extruder allows fast and continuous operation, with correct attachment of labels during the blowing process to the same part of the body of the bottle and as a result of the stationary mounting of the mould movements of the label are minimised. The extruder can be fitted with a double head, so that two parallel tubes can be extruded at the same time; these are then blown in the double moulds arranged on both sides of the extruder, in which attachment of the label during the blowing process and separation of waste material is still possible in two moulding cavities.

In the accompanying drawings which illustrate the invention by way of example

Figure 1:
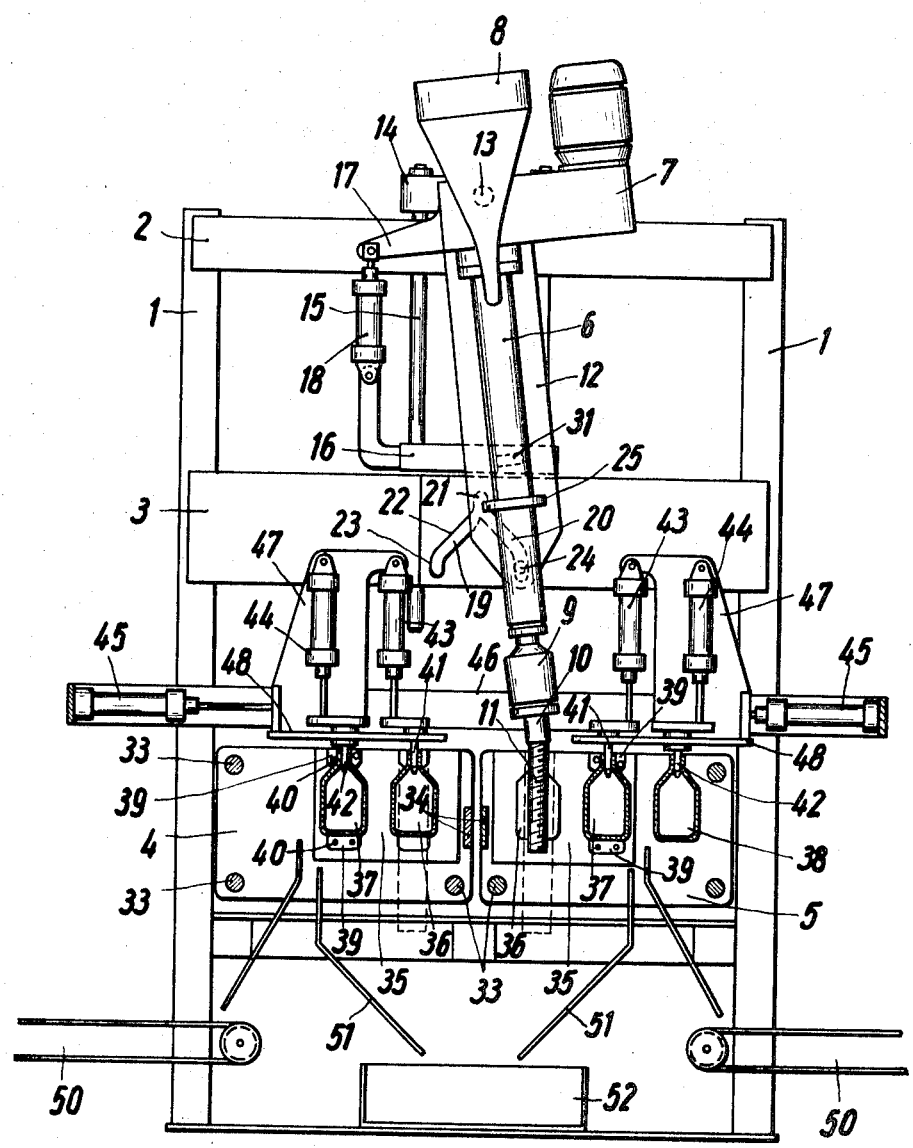
FIG. 1 is a front elevation of a two-mould blow moulding machine.
Figure 2:
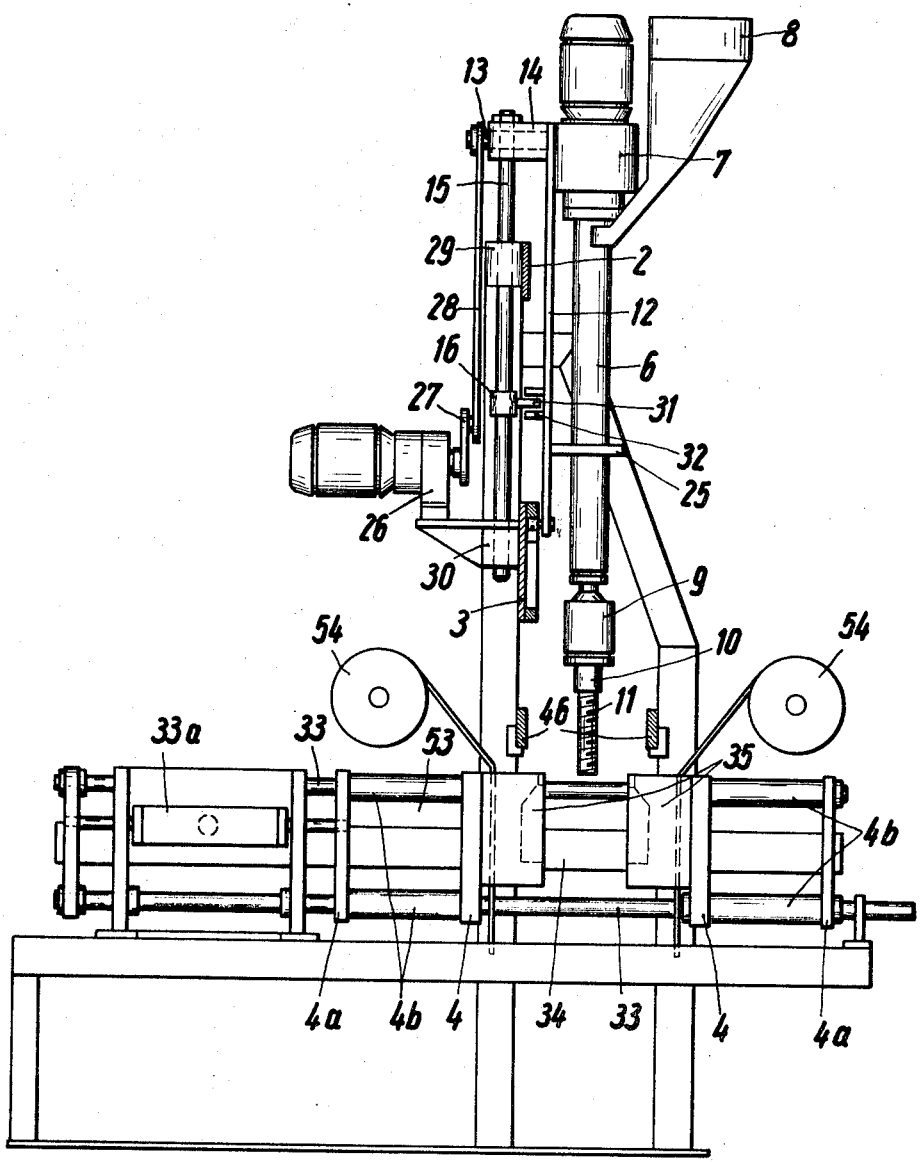
FIG. 2 is a side elevation of the machine shown in FIG. 1.

The machine has a stationary frame comprising vertical columns 1, onto which an upper cross-member 2 and a lower cross-member 3 are attached. Mould closing devices 4 and 5 and moulds 35 are arranged on opposite sides on an extruder 6. This will be described in detail later. The extruder 6 with its drive mechanism 7, a filling hopper 8, an extruder head 9 and nozzle 10 are mounted on a bracket plate 12, which has a hinge 13 at its top end, and the end of which is attached to an upper cross-piece 14, which, is attached to vertically moving bars 15. A lower cross-piece 16 is also attached to the bars 15. On the upper part of the bracket plate 12 a horizontal arm 17 is mounted carrying a drive unit 7. Between the end of the arm 17 and the lower cross-piece 16, is a piston-cylinder arrangement 18, the piston of which can be operated to extend or retract. On the lower cross-member 3, there is a groove-shaped guide track 19, comprising an upper almost vertical section 21, an intermediate section 22, inclined downwardly to the left, and a lower section 23, again approximately vertical. In mirror-image to this guide track 19, there is a further guide track 20. Both guide tracks have a common upper section 21. A guide roller 24 is arranged on the back of the bracket plate 12, which engages in the guide track. The bracket plate 12 has on its lower part a holding bar 25 which passes over the extruder 6, and by means of which the extruder 6 is connected to the bracket plate 12. A motor 26 is mounted on the machine frame, which operates a lever 28 by means of a crank 27; the end of this lever being attached to the upper cross-piece 14, so that when the motor rotates the upper cross-piece is moved up and down, together with the bar 15 and the lower cross-piece 16. The bars 15 are arranged in an upper guide 29 and in a lower guide 30, which are attached to the cross-members 2 and 3. To ensure that the extruder 6 is maintained in a vertical position, a supporting roller 31 is mounted by means of shackles 32 on the rear side of the bracket plate 12 and maintained in position by the weight of the extruder against the lower cross-piece 16.

Mould closing devices 4,5 are located on both sides of the extruder, each having two mould mounting plates 4 and 5 respectively onto which the two mould halves are secured. The mould mounting plates 4 and 5 have on their reverse sides rams 4b on the end of which there is a plate 4a, onto which the piston-cylinder arrangement acts to open and close the mould halves 35. The piston-cylinder arrangement 33a, which is firmly mounted on the machine frame, has two pistons one of which acts on the plate 4a, which together with the mould mounting plate 4 moves along bars 33. The other piston acts on the end plate joining the two bars 33. At the other end of the bars 33 the mould mounting plate 4 with its rams 4b and its plate 4a is attached, so that when the piston-cylinder arrangement 33a is operated, the two mould mounting plates 4 and the mould halves 35 are moved together or apart. Between the two mould closing devices 4, 5 there is, as FIG. 1 shows, a flat bar 34, which replaces the 4th round bar 33.

As FIG. 1 shows each mould half has two mould cavities, namely a mould cavity 36 for the blowing of the tube 11 and a mould cavity 37 for the removal of the waste and the ejection of the finished bottle 38. In the mould cavity 37 the top and bottom waste 39 is removed by means of a separator pin 40. Each mould 35 is fitted with a mould spindle 41 and a holding or separating spindle 42.

The moulding spindle 41 is raised and lowered by a piston-cylinder arrangement 43 and the holding spindle 42 by a piston-cylinder arrangement 44. Both cylinders are mounted on a bearing plate 47, which is located on a guide 46 in such a manner that it is movable in a transverse direction. A horizontal piston-cylinder arrangement 45, with which the bearing plate 47 is transversely displaceable, acts upon the bearing plate 47. A separator plate 48 is attached to the underside of the bearing plate 47. The machine is provided with a chute for the finished bottles, which are then conveyed on a conveyer belt 50. A further chute 51 is provided for the waste material, which is passed to a collector 52. The space 53 between the mould bearing plate 4 and the plate 4a that is linked with this serves as a mounting for a labelling device, in which the labels are taken from a roll 54 and passed to the mould cavity 36.

The operation of the machine is as follows. In the representation in FIG. 1 the extruder 6 is in the lowered position. The guide roller 24 mounted on the supporting plate 12 is in the lower section 23 of the guide track 20. In this position the extruder nozzle is directly above the axis of the moulding cavity 36 of the right hand mould 35. The extruded tube 11 passes between the mould halves 35 and, when the mould is closed, it is in the moulding cavity 36, after which the tube 11 is separated from the nozzle 10 by known means (not shown). In the moulding cavity 37 there is a finished blown bottle 38, the waste material of which 39 is removed by the pin 40. The bottle 38 that has been cleaned of waste material is now suspended on the spindle 42. To blow the tube 11 in the moulding cavity 36, the moulding spindle 41 and the holding spindle 42 are extracted upwardly out of the bottle 38, after which the finished bottle is caused to drop down by the separator plate 48 and is carried by the chute 59 to the conveyor belt. Now the bearing plate 47 is moved into the position shown in the left hand side of FIG. 1 by the operation of the piston-cylinder arrangement 45 and the moulding spindle 41 and the holding spindle 42 are lowered into the neck opening of the tube 11, or of the finished blown bottle 38.

When the tube 11 has been blown into a bottle, the two mould halves 35 are opened and the waste 39 drops down. Then the holding plate 47 is moved into the position shown in the right hand part of FIG. 1 by the operation of the piston-cylinder arrangement 45; the mould halves are then closed again and the waste 39 is separated from the blown bottle 38. The moulding spindle 41 and the holding spindle 42 are then drawn up out of the closed mould and the bottle drops down. The holding plate 47 with the raised moulding spindle 41 and the holding plate 42 are then returned to the position on the left as shown in FIG. 1, after which the entire process is repeated.

The piston and cylinder assembly 18 operates to ensure that the roller 24 is guided alternately from the guide section 21 into the sections 20 and 22 respectively so that the left and right hand moulds are supplied alternately with extrudate.

I claim:

1. A blow moulding machine having a movable extruder with an extruder head mounted above a blow mould wherein a guide track is provided for controlling movements of the extruder and extruder head, said guide track having an upper vertically extending section laterally displaced from a vertical axis of the mould, a lower vertically extending section providing a position for the extruder head for delivering extrudate into the mould and an inclined intermediate section connecting the upper and lower sections, and means is provided for moving said extruder along said track into and out of said delivery position.

2. A machine as claimed in claim 1, wherein the extruder is attached to a pivotal bracket plate carrying a guide roller adapted to roll in said track.

3. A machine as claimed in claim 2, wherein the bracket plate is hinged to a vertically movable cross-piece and a crank drive is provided for effecting vertical movements of the cross-piece.

4. A machine as claimed in claim 3, wherein said cross-piece is connected by vertical bars to a further cross-piece and said bracket plate carries a support roller in rolling engagement with said further cross-piece.

5. A machine as claimed in claim 1, comprising a pair of blow moulds, said upper vertically extending section of said guide track being positioned between the vertical axes of said moulds, the guide track comprising a pair of lower vertically extending sections, one for each of said moulds, and a pair of oppositely inclined intermediate sections leading from said upper section to said respective lower sections.

6. A machine as claimed in claim 5, wherein said moving means includs control means for controlling the extruder to move from the upper section of said guide track alternately into said oppositely inclined intermediate sections and said respective lower sections so as to deliver extrudate alternately to said respective moulds.

7. A machine as claimed in claim 6, wherein said extruder is carried by a pivoted member and said control means comprises a piston and cylinder arrangement operative on said pivoted member.

8. A machine as claimed in claim 1, wherein the or each mould comprises mould halves defining a moulding cavity and a waste removal and ejecting cavity and transfer means is provided for transferring a blow-moulded article from the moulding cavity to the waste-removal and ejecting cavity on separation of the mould halves.

* * * * *